W. WATTS.
CORN SHELLER.
APPLICATION FILED MAR. 24, 1910.
999,072.
Patented July 25, 1911.
2 SHEETS—SHEET 1.
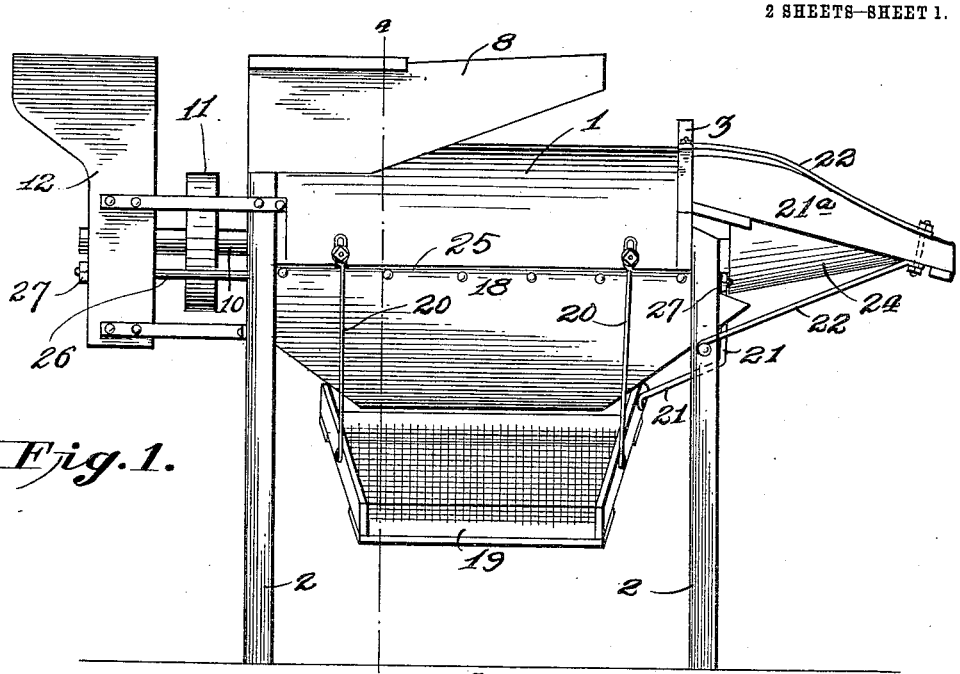
Fig. 1.
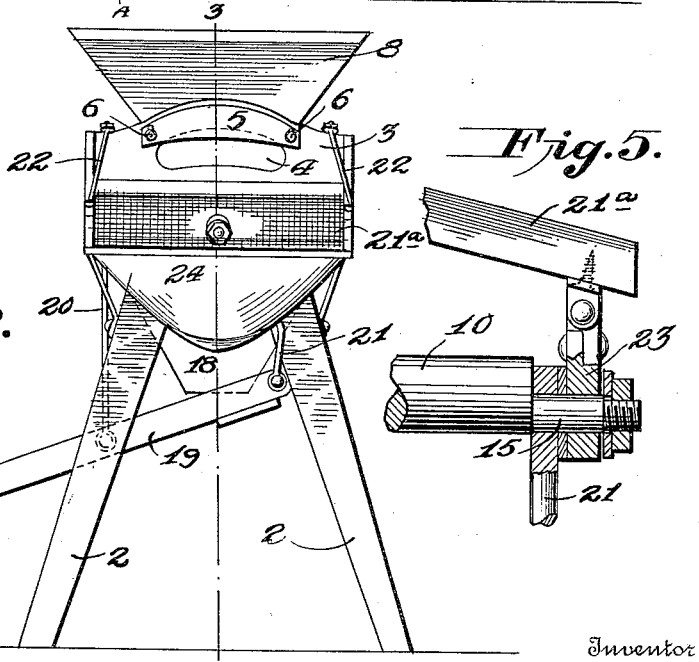
Fig. 2.
Fig. 5.
Witnesses
C. Everett Lancaster
H. Joseph Doyle
Inventor
William Watts,
By E. E. Vrooman,
his Attorney.

Witnesses
Inventor
William Watts,

UNITED STATES PATENT OFFICE.

WILLIAM WATTS, OF JACKSON, MICHIGAN.

CORN-SHELLER.

999,072.

Specification of Letters Patent.   Patented July 25, 1911.

Application filed March 24, 1910.   Serial No. 551,251.

*To all whom it may concern:*

Be it known that I, WILLIAM WATTS, a citizen of the United States of America, residing at Jackson, in the county of Jackson and State of Michigan, have invented certain new and useful Improvements in Corn-Shellers, of which the following is a specification, reference being had therein to the accompanying drawing.

This invention relates to corn shellers and the principal object of the same is to provide simple mechanism whereby the operation of shelling corn will be facilitated and also means whereby the shelled corn will be separated from the cobs.

In carrying out the object of the invention generally stated above it will be understood, of course, that the essential features thereof are necessarily susceptible of changes in details and structural arrangements, one preferred and practical embodiment of which is shown in the accompanying drawings, wherein:—

Figure 3:
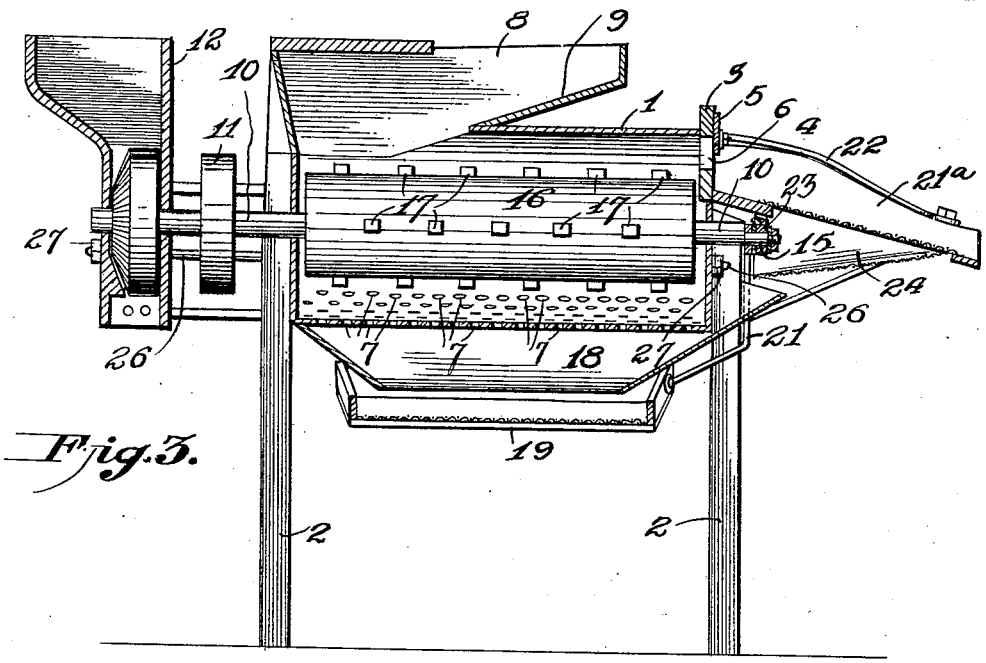
Figure 4:
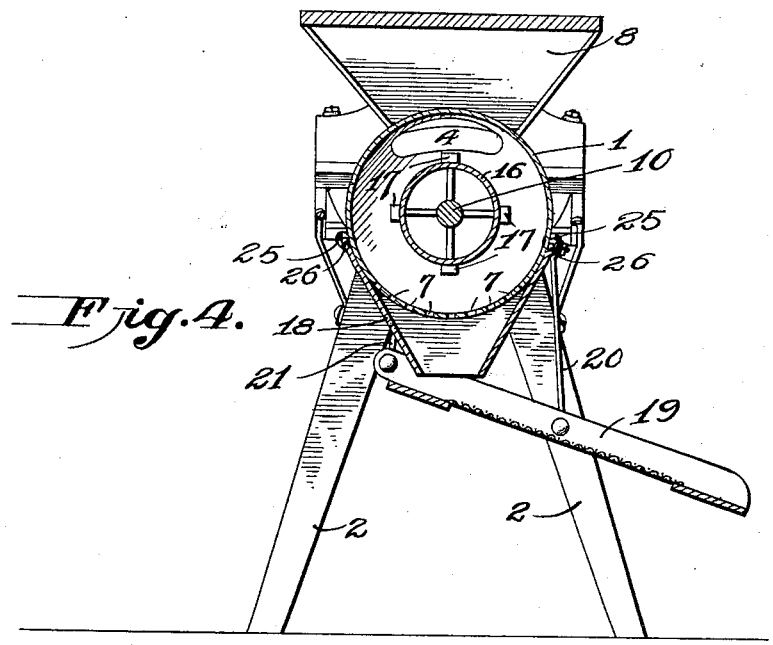

Figure 1 is a view in side elevation of the improved sheller. Fig. 2 is a view of one end thereof. Fig. 3 is a vertical longitudinal sectional view taken on the line 3—3, Fig. 2. Fig. 4 is a vertical transverse sectional view taken on the line 4—4, Fig. 1. Fig. 5 is a fragmentary detail view, shown partly in sections, illustrating the eccentric connections between the power shaft and the screens.

Referring to the accompanying drawings by numerals, it will be seen that the improved sheller consists of a hood 1 that is supported in a raised horizontal position by the end standards 2. Said hood is stationary and at one end has a cut-away portion in which a board 3 is mounted, said board being provided with an elongated discharge slot 4. A slide 5 adjustably mounted on set screws 6, regulates the amount of material discharged through said slot 4. The lower portion of the hood 1 is provided with perforations 7 through which the shelled corn is discharged. A feed hopper 8 has an inclined guideway 9 that guides the ears of corn to the end of the hood opposite the discharge outlet.

A shaft 10 extends longitudinally through hood 1, the ends of said shaft projecting beyond said hood. One end portion of said shaft is equipped with a pulley 11 by means of which said shaft may have a belt connection with a source of power, not shown. The other end of shaft 10 is provided with an eccentric projection 15. Shaft 10 on its end portion within hood 1 has a cylindrical drum 16 fast thereon, the outer surface of said drum being provided with a plurality of longitudinal rows of lugs 17 the lugs of the rows being arranged in staggered relation.

A discharge hopper 18 surrounds the lower portion of hood 1. A screen 19 is suspended on an incline beneath the outlet of hopper 18 by the arms 20 which have a pivotal connection with the intermediate portion of the sides of said screen, said arms having an adjustable connection with hood 1. At the rear end of one side of the screen a crank arm 21 has one end pivoted, the other end of said arm pivotally engaging the eccentric projection 15 of shaft 10.

An inclined screen 21ᵃ has one end held in position to receive the cobs discharged through outlets 4 by means of the rods 22 that have their ends detachably fastened to the said screen and the end board 3 of hood 1. Said screen has its bottom formed of meshed wires, the meshes of which are large enough to permit corn to fall through them. A crank arm 23 connects the inner end portion of said screen with the eccentric projection of shaft 10. A chute 24, which may be of textile material is arranged beneath screen 21, said chute being adapted to receive the corn that may drop through screen 21 and delivers the same to discharge hopper 18.

The operation of the machine is as follows:—The ears of corn are fed into the upper hopper 8 and are delivered to the closed end of hood 1. The rotation of shaft 10 causes the lugs of drum 16 to remove the corn from the ears, the corn falling through the perforated bottom of hood 1 to and through the discharge hopper and onto screen 19. While on screen 19, the foreign matter is separated from the corn by the agitation of said screen which agitation is imparted to the screen through its crank connection with the eccentrics of shaft 10. The cobs are whirled spirally toward the discharge end of hood 1 and are forced through outlet 4 and fall onto screen 21. Screen 21 is constantly agitated by its crank connection with the eccentric of shaft 10, so that the corn that may be discharged with the cobs falls through said screen and is conveyed to hopper 18 by the chute 24, and from hopper 18 the corn is delivered to screen 21 on which the foreign matter is separated from the corn by the agitation of the screen 21.

As is shown in Figs. 1 and 4, the upper edges of the hopper 18 are rolled as indicated at 25, and bolts 26 extend through said rolled edges. Lock nuts 27 are provided for the ends of said bolts 26. As will be obvious, said bolts 26 serve as supports for the hopper 18 and as but two are necessary, the use of the same obviate the employment of additional supports.

What I claim as my invention is:—

In a device of the character described comprising standards, a hood mounted thereon, a feed hopper for said hood, a discharge outlet for said hood, a shaft in said hood, eccentric agitating means at one end of said shaft, shelling means mounted on said shaft, said hood also provided with screening means at one end, said screening means being attached to said agitating means, a perforated bottom for said hood, a discharge hopper under said bottom and adapted to receive shelled corn from said hood and also said screening means, a screen beneath said hopper, supporting means adjustably secured to said hood and pivotally connected to said screen intermediate its front and rear edges, and an angle arm secured adjacent the rear edge of said screen and also to said eccentric agitating means, thereby permitting a vertical reciprocating movement to both the screening means at one end of said hood and to the screen mounted below said discharge hopper.

In testimony whereof I hereunto affix my signature in presence of two witnesses.

WILLIAM WATTS.

Witnesses:
L. A. WHITE, Jr.,
H. E. MOREHOUSE.

---

Copies of this patent may be obtained for five cents each, by addressing the "Commissioner of Patents. Washington, D. C."